Figures 1, 2:
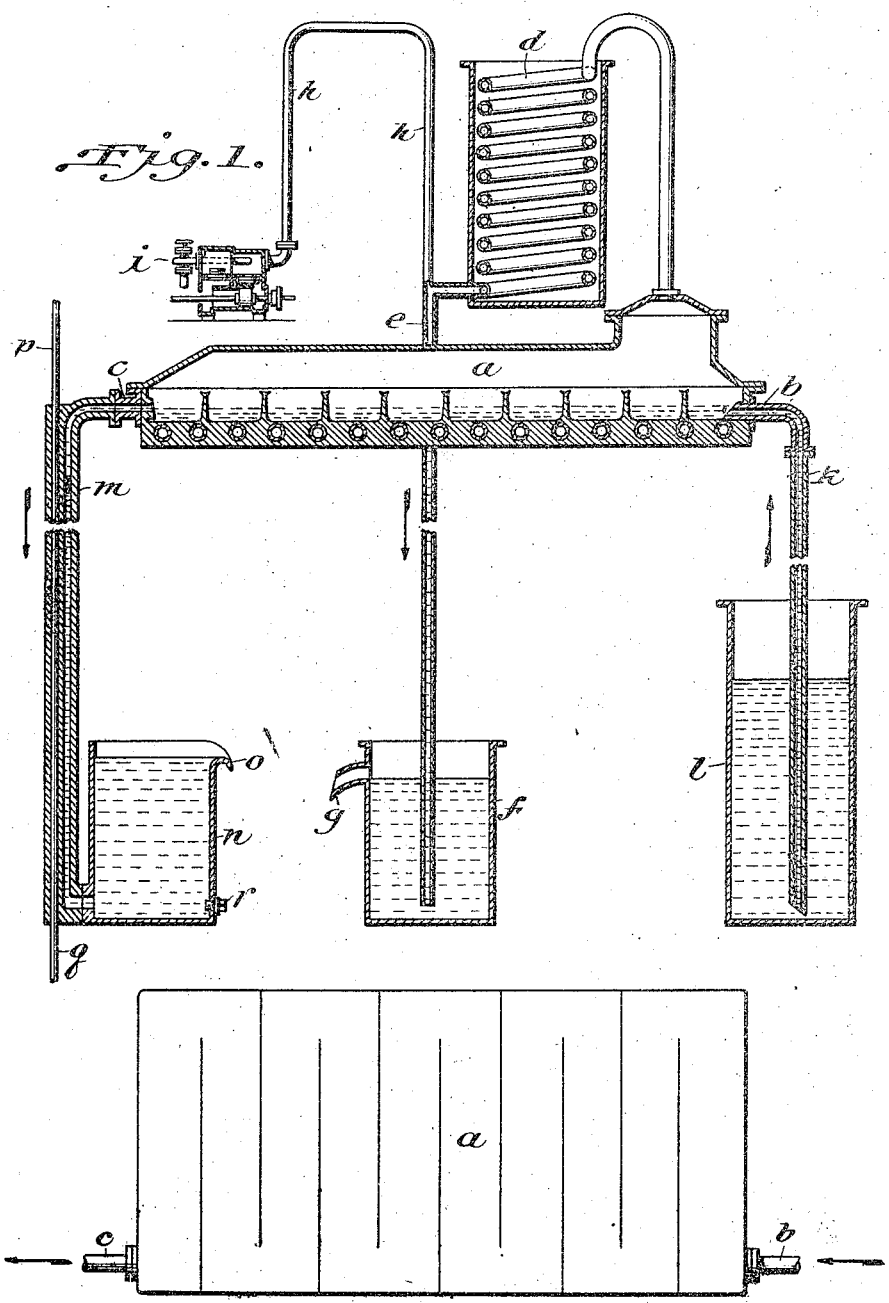

F. RASCHIG.
PROCESS FOR THE PRODUCTION OF NITRIC ACID.
APPLICATION FILED APR. 21, 1914.

1,130,104.

Patented Mar. 2, 1915.

Witnesses:
M. A. McDaniel
N. C. Morse

Inventor
Fritz Raschig
By H. Schweitzer
Atty

UNITED STATES PATENT OFFICE.

FRITZ RASCHIG, OF LUDWIGSHAFEN-ON-THE-RHINE, GERMANY.

PROCESS FOR THE PRODUCTION OF NITRIC ACID.

1,130,104.  Specification of Letters Patent.  Patented Mar. 2, 1915.

Application filed April 21, 1914. Serial No. 833,533.

*To all whom it may concern:*

Be it known that I, FRITZ RASCHIG, doctor of philosophy, chemist, a citizen of the German Empire, residing at Ludwigshafen-on-the-Rhine, Germany, have invented new and useful Improvements in Processes for the Production of Nitric Acid, of which the following is a specification.

This invention relates to the production of nitric acid; and it comprises a continuous process of producing nitric acid from a nitrate and an acid such as sodium nitrate and sulfuric acid by distilling such mixture under a high vacuum approximating a perfect vacuum and at a temperature corresponding to such vacuum, the mixture being run continuously into the distillation vessel and the products of distillation being continuously removed, while the resulting bisulfate mixture also escapes in a continuous manner; all as more fully hereinafter set forth and as claimed.

It has been heretofore proposed to make nitric acid in a continuous manner from sodium nitrate and sulfuric acid by running the mixture through a retort or series of retorts maintained at ordinary atmospheric pressure and at a progressively increasing temperature; in the case of a series of retorts, the temperature being that necessary to effect the reaction and distillation at this pressure. But this process has the disadvantage resulting from the necessary high temperatures, of about 270° C., and the wear and tear of the apparatus caused by this heat. It has also been proposed to make nitric acid of high degree of purity by carrying out the reaction *in vacuo*, but this process, while giving high strength acid and good yields, is intermittent and requires discharging and recharging of the apparatus after the distillation of each charge.

It is an object of the present invention to overcome these disadvantages, and to produce nitric acid from nitrate and sulfuric acid, or their equivalents by a process which is not only a vacuum process using a high vacuum, but which is also a continuous process carried out under a high vacuum and at a correspondingly lower temperature which new process avoids the wear and tear and corroding action caused by the high temperatures necessary at ordinary pressure.

The process of the present invention comprises the continuous distillation of a mixture of sodium nitrate and sulfuric acid, or their equivalents, by allowing a fluid or pasty mixture of the sodium nitrate and sulfuric acid to run continuously into one end of a heated vacuum pan. In this pan the nitric acid is generated and distilled off at a temperature of 70 to 170° C. into a suitable condenser. From this pan the liquid bisulfate remaining after the distillation, escapes at the other and remote end, the inlet and outlet connections, as well as the condenser outlet, being pipes at least six meters long. The vacuum in the vacuum pan is maintained by a suitable vacuum pump attached to the condenser, or by other suitable means, so that a vacuum is maintained corresponding to the head of liquid in said barometer pipes of six meters length, it being understood that the head of liquid in these pipes will depend somewhat on the specific gravity of the liquid mixture, as well as upon the barometric pressure.

In the accompanying drawings is illustrated one form of apparatus in which the process of the present invention can be practised. It is understood that the invention is illustrated by, but not confined to, this particular form or construction of apparatus.

In these drawings Figure 1 shows the apparatus as a whole with parts shown in section, the illustration being in part diagrammatic; and Fig. 2 is a top view of the vacuum pan with the cover removed, this illustration being also diagrammatic.

The apparatus illustrated comprises a flat cast iron pan *a* separated by partitions extending alternately from each side to near the other side to form a prolonged zigzag course for the liquid passing through it, and having a suitable inlet *b* and outlet *c*. The vacuum pan *a* may be heated in any suitable manner, as by direct flame or steam, but is shown as having a steam coil embedded in its bottom wall, steam being supplied at a temperature *e. g.* about 170° C. and a corresponding pressure of about twelve or fourteen atmospheres. From the top of the vacuum pan the nitric acid vapors are conducted through a condensing coil *d* made of a pipe of clay or of other suitable material. The vapors are here condensed and flow into the aluminum tube *e* attached to the condenser and having a length of about seven meters, the lower end of this pipe being immersed in a suitable receptacle $f$ for receiving the nitric acid. This receptacle is also of aluminum and has a suitable outlet $g$. The pipe $h$, also attached to the coil, connects with the wet pump $i$ which is fed with milk of lime to neutralize and render innocuous any acid fumes entering the pump. The inlet $b$ has attached thereto a suitable pipe K which is at least six meters long and reaches into a vessel $l$ at its lower end. The outlet $c$ is also connected to a similar pipe $m$, which may be of iron, through which the liquid bisulfate runs into the receptacle $n$ provided with suitable overflow or outlet $o$.

In order to prevent cooling and solidifying of the bisulfate in the pipe $m$, either during the operation of the apparatus, or when the apparatus is out of order, this pipe is provided with suitable heating means, shown as a steam pipe $p$—$g$ extending through an extension of the pipe $m$, and bringing the steam into heat interchanging relation therewith. In order to prevent solidifying of the bisulfate in the receptacle $n$, if the apparatus should become out of order, this receptacle is provided with a lower discharge $r$ to permit emptying.

In the operation of this apparatus, and the practising of the process of the present invention, the mixture of sodium nitrate and sulfuric acid, or their equivalents, is placed in the receptacle $l$. This mixture may be made up, for example, of 100 parts of sodium nitrate (96%) and 130 parts of sulfuric acid (94%). In starting the apparatus the receptacle $n$ is filled with concentrated sulfuric acid, $f$ with nitric acid, and $l$ with the mixture indicated. The pan $a$ is then heated by the steam coil, and also the pipe $m$ by the steam pipe $p$—$g$, and the vacuum pump $i$ is put in operation. At the same time an even current of the above mixture is run into the receptacle $l$. It will be noted that this receptacle extends above the receptacles $n$ and $f$ and that its liquid contents also can extend above the liquid level of these other receptacles. As the vacuum pump sucks the air and gases out of the apparatus the atmospheric pressure forces the liquids from these various receptacles into the barometer pipes $e$, $k$ and $m$, the height of liquid being determined by the difference between the pressure in the apparatus and the atmospheric pressure. The length of the pipes $e$ and $m$, however, are usually such that the liquid cannot be drawn back into the apparatus. The length of these pipes is greater than the height of the columns of liquid corresponding to a perfect vacuum, while the length of the inlet pipe K and the height of the level of liquid in its receptacle $l$ are such that the liquid column is less than that corresponding to the vacuum in the vacuum pan, so that the liquid or pasty mixture is drawn into the pan by the vacuum, and continuous to be drawn as long as the liquid mixture in $l$ is replenished and the head of liquid in the pipe $k$ does not equal or exceed that corresponding to the vacuum maintained in the apparatus. When the apparatus has once been put in operation the mixture is drawn up from the receptacle $l$ through the pipe $k$ into the vacuum pan in the manner just indicated, and in this pan, owing to the influence of the heat, the nitric acid is evolved and removed, escaping through the condenser $d$ into the pipe $e$ and the receptacle $f$, from which it escapes at $g$. The bisulfate formed and resulting from the distillation, escapes at $c$ into the pipe $m$ and thence into the receptacle $n$, replacing the sulfuric acid originally placed in this receptacle until finally the bisulfate escapes at $o$ into suitable molds or receptacles in which it may be permitted to cool and solidify. It will be understood that the head of liquid in the pipes $m$ and $e$ corresponds to the degree of vacuum in the vacuum pan, or, in other words, to the difference in pressure between that in the pan and the atmospheric pressure, while the head of liquid in the pipe K is slightly less than that corresponding to this difference, so that the outside atmospheric pressure forces the liquid mixture up through this pipe into the apparatus, this liquid being replenished in the receptacle $l$ in a continuous manner, and the rate of flow being thus controlled. The zigzag arrangement of the vacuum pan causes the liquid in it to travel in a prolonged course and to be exposed continuously to the heating action so that completion of the process is insured.

It will be seen that the process of the present invention is continuous in operation, that it operates at a high vacuum approximating a perfect vacuum, that a much lower temperature can be utilized, and that no other operating mechanism than the vacuum pump is necessary. The temperature used, about 170° C., is about 100° lower than that necessary in processes carried out at atmospheric pressure, where a temperature of around 270° C. must be applied. The use of a low temperature causes a corresponding economy in fuel, and a material saving in the wear and tear of the apparatus, due to corrosion, etc. The present process, moreover, gives an excellent yield of high percentage nitric acid.

It will be understood that variations and modifications may be made in the process of the present invention without departing therefrom; and that other specific structures of apparatus may also be employed in carrying out this process; it being intended to illustrate the invention by the specific embodiment thereof described in this specification, but not to limit the invention to the same.

I claim:

1. The continuous process of producing nitric acid from a mixture of a nitrate and sulfuric acid, which comprises distilling such mixture under a high vacuum, continuously removing the nitric acid evolved, supplying such mixture in a continuous manner to be distilled, and also removing the bisulfate formed in a continuous manner.

2. The continuous process of producing nitric acid from a mixture of sodium nitrate and sulfuric acid, which comprises distilling such mixture at a temperature of about 170° and under a high vacuum corresponding to this temperature, continuously removing the nitric acid evolved, supplying such mixture in a continuous manner to be distilled, and also removing the bisulfate formed in a continuous manner.

3. The continuous process of producing nitric acid from a mixture of a nitrate and sulfuric acid, which comprises distilling such mixture under a high vacuum approximating a perfect vacuum, continuously removing the nitric acid evolved, supplying such mixture in a continuous manner through a conduit containing therein a head of liquid corresponding approximately to the vacuum employed, and also removing the bisulfate formed in a continuous manner through a conduit containing a head of liquid corresponding to the vacuum employed.

4. The continuous process of producing nitric acid from a mixture of sodium nitrate and sulfuric acid, which comprises distilling such mixture at a temperature of about 170° and under a high vacuum corresponding to this temperature, continuously removing the nitric acid evolved, supplying such mixture in a continuous manner through a conduit containing therein a head of liquid corresponding approximately to the vacuum employed, and also removing the bisulfate formed in a continuous manner through a conduit containing a head of liquid corresponding to the vacuum employed.

In testimony whereof I have hereunto set my hand in the presence of two subscribing witnesses.

FRITZ RASCHIG.

Witnesses:
ROBERT GERLACH,
RICHARD REMMELE.